United States Patent
Strybel

[11] 3,726,171
[45] Apr. 10, 1973

[54] TUBE CUTTER
[75] Inventor: Richard V. Strybel, Elk Grove Village, Ill.
[73] Assignee: Imperial-Eastman Corporation, Chicago, Ill.
[22] Filed: Oct. 9, 1970
[21] Appl. No.: 79,400

[52] U.S. Cl. .................................. 83/643, 83/467
[51] Int. Cl. ........................................... B26d 5/10
[58] Field of Search ................. 83/643, 642, 644, 83/467

[56] References Cited

UNITED STATES PATENTS

| | | | |
|---|---|---|---|
| 1,365,475 | 1/1921 | Fidler | 83/643 X |
| 1,320,923 | 11/1919 | Richard | 83/467 |
| 3,055,266 | 9/1962 | Frantz et al. | 83/643 X |
| 3,143,909 | 8/1964 | Ehlert | 83/467 X |
| 1,031,924 | 7/1912 | Hallock | 83/467 |

*Primary Examiner*—J. M. Meister
*Attorney*—Hofgren, Wegner, Allen, Stellman & McCord

[57] ABSTRACT

A tube cutter having a knife and means for moving the knife across a tube to be cut. The knife is movable so as to have a maximum slicing action at the beginning of the cut.

1 Claim, 4 Drawing Figures

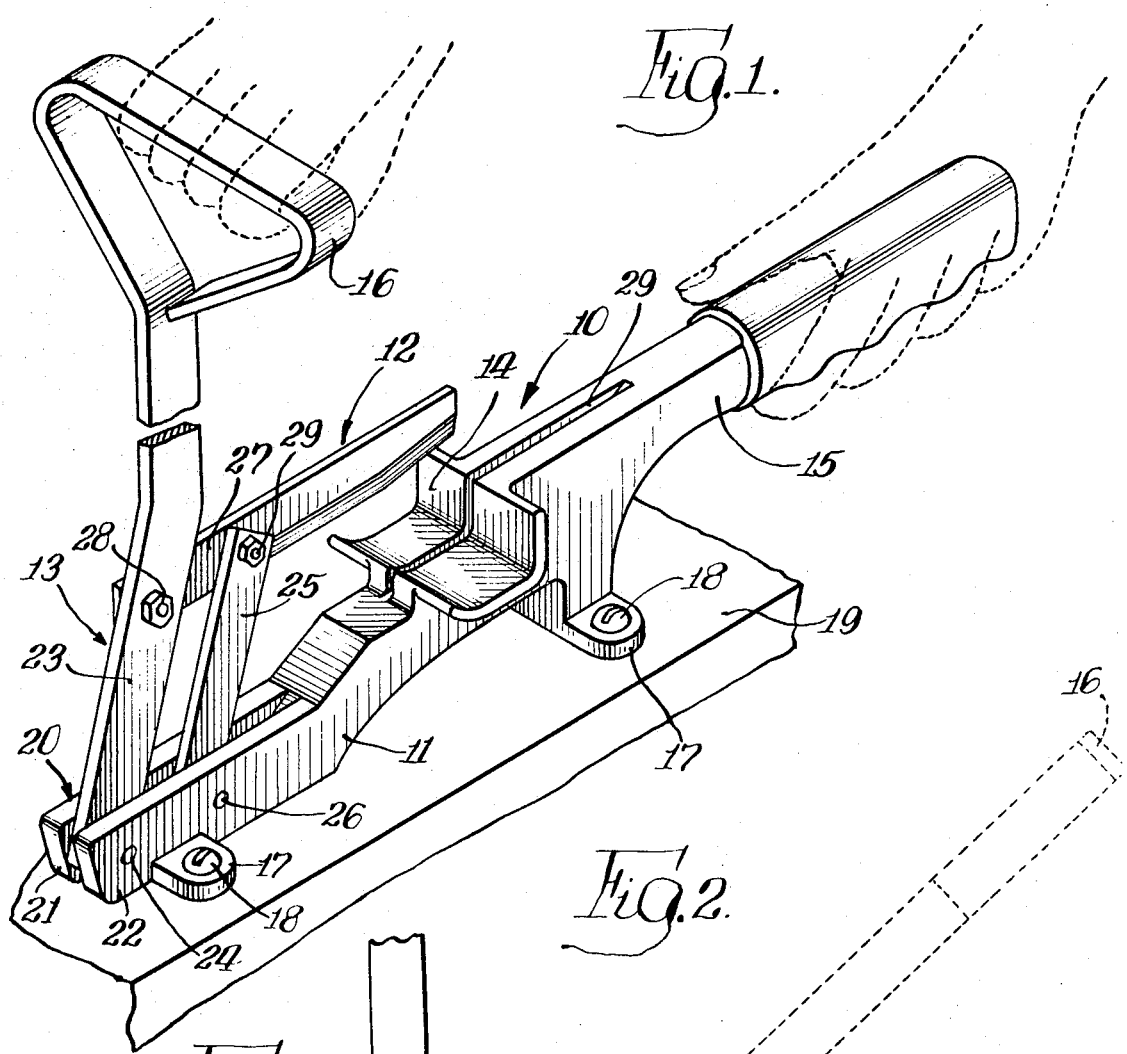
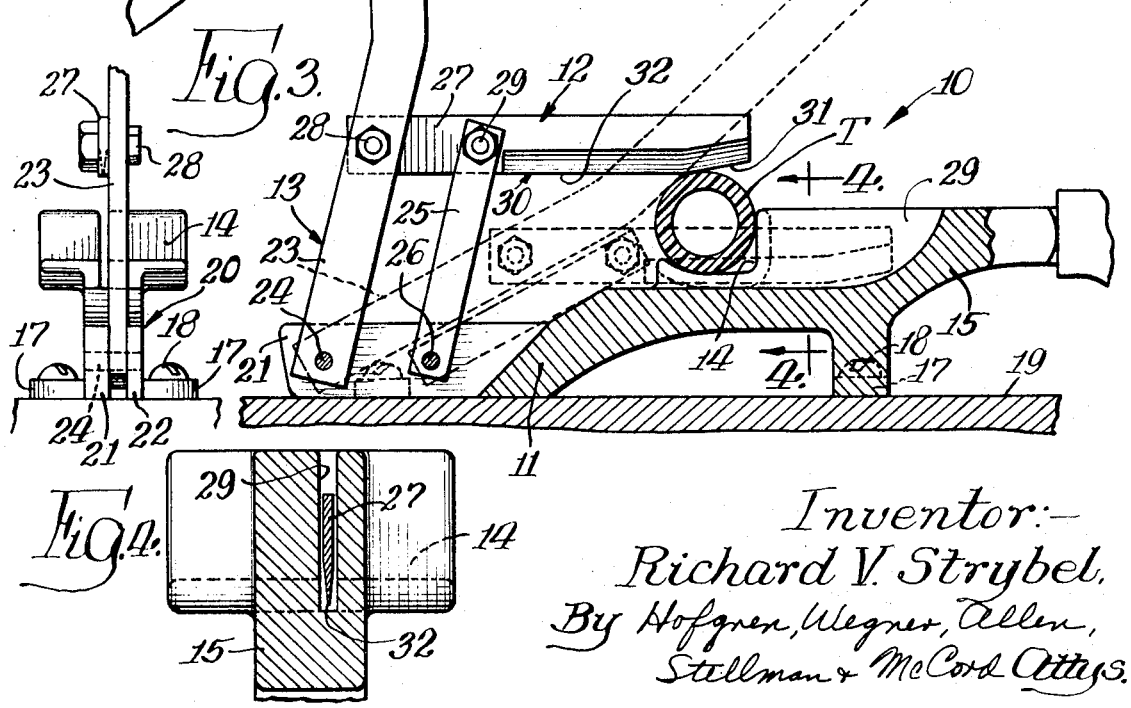
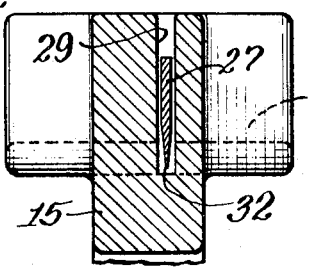

TUBE CUTTER

BACKGROUND OF THE INVENTION

1. Field of the Invention

This invention relates to tube cutters and in particular to cutters for use with soft tubing such as plastic tubing and hose.

2. Description of the Prior Art

In conventional tube cutters, a cutting wheel is urged against the outer surface of the tube while the cutter is swung around the axis of the tube. The cutting wheel is urged progressively into the tube during the swinging action so as to progressively score and cut into the tube surface.

Alternatively, cutting saws have been utilized for cutting plastic and rubber hose. Conventional cutting saws utilize a power driven rotary saw blade and means for holding the hose in a bent configuration for facilitating the saw cutting action and are relatively costly and cumbersome.

SUMMARY OF THE INVENTION

The present invention comprehends an improved tube cutter tool such as for use in cutting soft tubular elements such as plastic tubing or hose. The tube cutter includes an elongated knife having a sharp cutting edge and means for causing the knife to slice through a tubular element carried on a suitable support associated with the tool.

The tool may be manually operable by means of suitable handles. The means for mounting the knife is arranged to cause the knife to have effectively maximum slicing action at the beginning of the cut to facilitate entry of the knife into the tube wall. The tool handles may be arranged to provide a mechanical advantage in the movement of the knife for further facilitated cutting of the tube.

More specifically, the invention comprehends the provision of an improved cutting tool including means for supporting a workpiece to be cut, a knife for cutting the workpiece, means for mounting the knife adjacent the supporting means for movement concurrently across and into the workpiece with the ratio of the movement of the knife across the workpiece to the movement of the knife into the workpiece being greatest at the position of initial contact of the knife with the workpiece thereby to provide maximum slicing action at the contact position for facilitated cutting of the workpiece, and means for forcibly moving the knife on the supporting means.

The tube cutter of the present invention is extremely simple and economical of construction while yet providing an improved tube cutting functioning as discussed above.

BRIEF DESCRIPTION OF THE DRAWING

Other features and advantages of the invention will be apparent from the following description taken in connection with the accompanying drawing wherein:

FIG. 1 is a fragmentary perspective view of a tube cutter employing the invention;

FIG. 2 is a fragmentary longitudinal section thereof with the knife being shown in full lines as at the beginning of a cutting operation and in dotted lines as upon completion of the cutting operation;

FIG. 3 is a fragmentary end elevation thereof; and

FIG. 4 is a fragmentary vertical section taken substantially along the line 4—4 of FIG. 2.

DESCRIPTION OF THE PREFERRED EMBODIMENT

In the exemplary embodiment of the invention as shown in the drawing, a cutting tool generally designated 10 is shown to comprise a tube cutter having a base 11, a knife 12, and mechanism 13 for movably mounting the knife on the base for slicing through a tube T carried in a support 14 defining a cutting zone on the base adjacent knife 12. A first handle 15 is connected to the base and a second handle 16 is associated with mechanism 13 for effecting forceful movement of knife 12 through tube T to cut the tube.

Base 11 may be provided with a plurality of feet 17 adapted to receive suitable screws 18 such as for attachment of the tool to a table 19 when desired.

As best seen in FIG. 1, base 11 includes a bifurcated end 20 remote from handle 15 having spaced parallel legs 21 and 22. Mechanism 13 includes a first link 23 movably connected to legs 21 and 22 by a pivot 24 and a second link 25 movably connected to legs 21 and 22 by a pivot 26. Link 23 is connected to one end 27 of knife 12 by a pivot 28 and to link 25 by a pivot 29 thereby to define a parallel equal crank linkage mechanism whereby knife 12 extends longitudinally substantially parallel to handle 15 and flatwise perpendicularly to the axis of tube T as it is swung toward support 14 on pivots 24, 26, 28 and 29.

As best seen in FIG. 1, handle 16 comprises an extension of link 23 to provide a mechanical advantage in the operation of linkage mechanism 23.

Base 11 and support 14 are provided with a longitudinal slot 29 for receiving knife 12 as the knife cuts through the tube T carried on support 14 during the cutting operation. As best seen in FIG. 2, knife 12 includes a cutting edge 30 including a distal portion 31 and a main portion 32. Distal portion 31 extends at a small angle to portion 32 to permit minimizing of the length of links 23 and 25 and provide improved cutting coaction with the outer surface of tube T. As best seen in FIG. 2, the linkage mechanism 23 is arranged to provide a movement of knife edge 30 both longitudinally and laterally relative to knife 12 so as to cause the ratio of movement of the knife across the tube T to the movement of the knife radially into the tube T to be greatest at the position of initial contact with the tube. Thus, the tool provides maximum slicing action at the initial contact position for facilitated cutting of the tube. As the linkage mechanism is swung downwardly during the cutting action, the ratio decreases to provide a minimum ratio at the final position shown in dotted lines in FIG. 2 whereat the tube is completely cut by the knife to complete the cutting operation. It has been found that by providing maximum slicing action at the initial contact of the knife with the tube and progressively increasing the amount of radial movement of the knife relative to the tube as the knife cuts therethrough, an improved cutting action is obtained which is not only facilitated but also provides an improved clean cut of the tube.

In describing the invention, the element to be cut has been described as a tube. As will be obvious to those skilled in the art, the element can comprise any suitable workpiece adapted to be cut by the knife. The support 14 is adapted for use with a tubular workpiece and may be suitably rearranged to support other workpiece configurations as desired within the scope of the invention. Further, the invention is disclosed as one wherein the links 23 and 25 are maintained in parallel association by equal spacing of pivots 24, 26, 28 and 29. As will be obvious to those skilled in the art, other suitable linkage arrangements may be provided for effecting the desired change in the ratio of longitudinal slicing movement to lateral inward movement of the knife relative to the workpiece as desired.

Knife 12 may be formed of any suitable knife material, such as steel, providing a sharp edge 30 having long life in the cutting action. Support 14 defines a shoulder means effectively limiting movement of the workpiece in the direction of the longitudinal movement of knife 12 during the cutting operation to assure a positive clean cut of the workpiece by the knife in moving through the cutting zone to the final position shown in dotted lines in FIG. 2. As discussed above, tool 10 is extremely simple and economical of construction while providing the improved cutting action.

The foregoing disclosure of specific embodiments is illustrative of the broad inventive concepts comprehended by the invention.

I claim:

1. A cutting tool comprising: means for supporting a workpiece to be cut; a knife for cutting said workpiece; means for mounting said knife adjacent said supporting means for movement concurrently across and into said workpiece with the ratio of the movement of the knife across said workpiece to the movement of the knife into said workpiece being greatest at the position of initial contact of the knife with the workpiece thereby to provide maximum slicing action at the contact position for facilitated cutting of the workpiece; said knife defining a cutting edge having an inner portion extending parallel to the direction of movement of the knife across the workpiece and into the workpiece; and means for forcibly moving said knife on said supporting means.

* * * * *